United States Patent [19]

Swinbanks

[11] Patent Number: 5,609,230
[45] Date of Patent: Mar. 11, 1997

[54] VIBRATION CANCELLATION DEVICE

[75] Inventor: Malcolm A. Swinbanks, Cambridge, United Kingdom

[73] Assignee: MAS Research Limited, Cambridge, United Kingdom

[21] Appl. No.: 252,556

[22] Filed: Jun. 1, 1994

[30] Foreign Application Priority Data

Jun. 10, 1993 [GB] United Kingdom ............ 9312021

[51] Int. Cl.⁶ .................... F16F 15/03; F16F 15/18
[52] U.S. Cl. .................... 188/267; 310/51; 318/254; 188/378
[58] Field of Search .................... 188/267, 378, 188/380; 267/140.14, 140.15, 258; 73/668; 104/284; 181/202, 206, 209; 248/550, 559, 562, 636, 638; 310/51, 90.5; 318/114, 115, 128; 324/76.71, 117 H; 364/574; 381/71; 505/907

[56] References Cited

U.S. PATENT DOCUMENTS

| | | | |
|---|---|---|---|
| Re. 33,937 | 5/1992 | Schubert | 248/550 X |
| 4,273,054 | 6/1981 | Yamashita et al. | 505/907 X |
| 4,615,504 | 10/1986 | Sandercock | 248/550 |
| 4,650,170 | 3/1987 | Fukushima | 267/140.15 X |
| 4,841,204 | 6/1989 | Studer | 318/254 |
| 4,848,525 | 7/1989 | Jacot et al. | 188/378 |
| 4,947,067 | 8/1990 | Habermann et al. | 310/51 |
| 4,999,534 | 3/1991 | Andrianos | 318/128 X |
| 5,248,133 | 9/1993 | Okamoto et al. | 267/136 |
| 5,256,952 | 10/1993 | Yoneyama et al. | 318/623 X |
| 5,269,159 | 12/1993 | Oh | 248/550 X |
| 5,385,217 | 1/1995 | Watanabe et al. | 248/550 X |
| 5,387,851 | 2/1995 | Nuscheler et al. | 248/550 X |

FOREIGN PATENT DOCUMENTS

| | | |
|---|---|---|
| 0338933 | 10/1989 | European Pat. Off. . |
| 1601096 | 10/1981 | United Kingdom . |
| 2222279 | 2/1990 | United Kingdom . |

OTHER PUBLICATIONS

CME, Jan. 1983, pp. 41–47, "Anti–noise — The Essex Breakthrough", Professor Barrie Chaplin.

Primary Examiner—Matthew C. Graham
Attorney, Agent, or Firm—Spencer & Frank

[57] ABSTRACT

The invention provides a vibration cancellation device for rigidly mounting to or forming part of an apparatus subject to vibration. The device comprises a mass supported by magnetic levitation but which is magnetically driven to provide vibration cancelling relative movement, movement sensors controlling the application of power, in a relative motion cancellation direction.

22 Claims, 2 Drawing Sheets

VIBRATION CANCELLATION DEVICE

BACKGROUND OF THE INVENTION

1. Field of the Invention

This invention concerns a vibration cancellation device. There is a considerable potential for an active vibration cancellation device able to reduce overall vibration of mechanical structures. Such devices could be attached to or embedded in struts, pipes or masts that are subject to vibration forces in order to eliminate these by active cancellation techniques. In addition, machinery is conventionally mounted on some type of passive mounting arrangement to reduce the severity of transmitted vibration to a supporting structure therefor. The use of an active vibration cancellation device, mounted near the base of such passive mounts can be used substantially to improve overall performance by cancelling vibrations which would otherwise be transmitted into the supporting structure.

2. Background Information

Active vibration cancellation has been experimented with in the past particularly in the case of engines running at a steady speed where the vibration energy spectrum has a significant content in only a few harmonics of the engine rotation rate. This allows one to use narrow-band active cancellation techniques only, which techniques are the simplest to implement. The cancellation technique tried was to use oscillating masses to suppress the resultant narrow band mechanical vibrations. However, heretofore, to generate an anti-phase momentum in a required direction, the oscillating mass had to be mechanically supported. A linear oscillating mass of an active vibration canceller is described in, for example, the journal of the Chartered Mechanical Engineer, January 1983, pages 41 to 47 (particularly page 44 and FIG. 13) in a paper by G. B. B. Chaplin. Other active vibration cancelling devices are described and shown in UK Patent Specifications Nos. 1,601,096 and 2,222,279. Usually, some form of diaphragm or spider support was provided to limit motion of the mass to the correct axis. In practise, such linear supports, spiders or diaphragms proved to be unreliable, through wear and fatigue. There was also a more significant objection: they could not easily withstand shock loading. This, along with their demonstrated unreliability, resulted in the idea largely being dropped.

SUMMARY OF THE INVENTION

Accordingly, it is an object of the present invention to provide an active vibration cancellation device having a very high reliability and resistance to shock, which device is able to minimise or cancel the linear and/or angular momentum of vibrations (mechanical vibrations, in general, involve both linear and angular motion), in a structure.

According to the present invention, there is provided a device, for reducing vibration of a structure, comprising a mass having a rest position motionlessly supported from the structure by a magnetic field, means for sensing the vibration, and means for controlling the magnetic field to vibrate the mass and, by reaction, to apply an antiphase vibration to the structure.

The invention also provides a device, for reducing vibration of a structure, comprising an auxiliary mass supported by the structure by a magnetic field, sensing means for sensing the vibration, and means for vibrating the auxiliary mass by varying the magnetic field, in accordance with the sensed vibration whereby to apply, by reaction, antiphase vibration to the structure.

The invention further provides a vibration cancellation device for rigidly mounting to or forming part of a structure subject to vibration in at least one plane and/or about at least one axis, the device comprising an auxiliary mass supported by magnetic levitation for movement relative to the structure in the at least one plane and/or about the at least one axis, sensing means for sensing the vibration-induced relative movement, force applying means, and control means for receiving the output of the sensing means and for causing the force applying means to apply force to vibrate the mass and, by reaction, to provide antiphase forces to reduce vibration of the structure.

BRIEF DESCRIPTION OF THE DRAWINGS

The invention will be described further, by way of example, with reference to the accompanying drawings, in which.

DETAILED DESCRIPTION OF THE PREFERRED EMBODIMENTS

Figure 1:
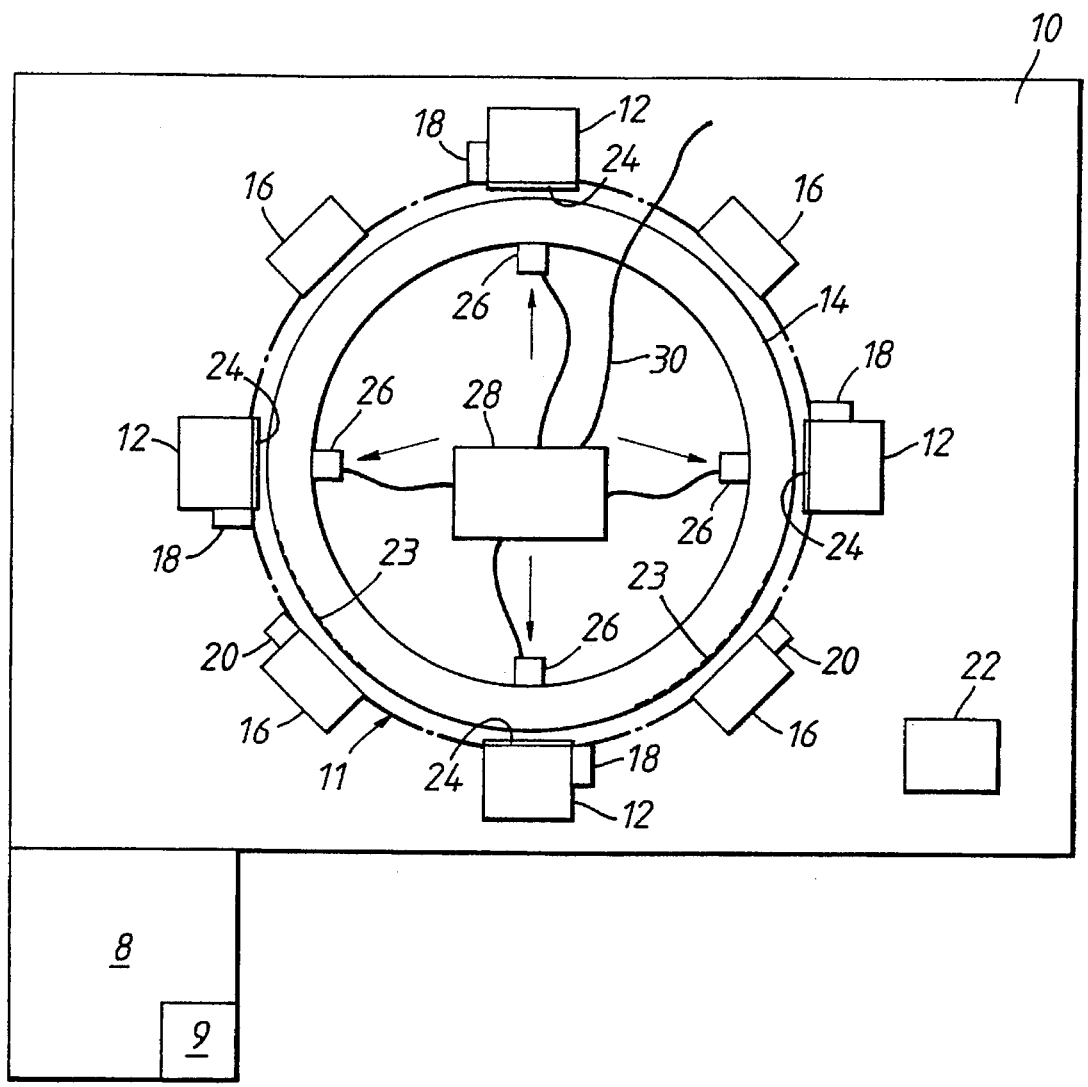
FIG. 1 is a diagrammatic representation of a vibration cancellation device in accordance with the present invention.

As shown in the drawings, a vibration cancellation device comprises a frame 10 forming part of or for rigidly mounting to an apparatus 8 subject to vibration from an included vibration source 9. The frame 10 includes a flanged hollow non-ferro-magnetic spherical shell or cage 11 having a major hemisphere 11a and a minor hemisphere 11b (see FIGS. 2 and 3) each having flanges 11c enabling the hemispheres to be secured together, and to the frame 10 or to an apparatus subject to vibration, by bolts (not shown) extending through holes 11d in the flanges 11c. The shell 11 supports three pairs (of which only two pairs are shown) of radial drive electromagnets 12, each pair being located one at each end of a respective one of three orthogonal diameters of the spherical interior of the shell 11. An anti-vibration body in the form of a hollow steel sphere 14 is located in the spherical space defined interiorly of the shell 11. The sphere 14 is in the form of two hemispheres 14a and 14b, which are secured together along a join line 14c. The magnets 12 serve to support, by magnetic levitation, the sphere 14, when the sphere is at rest, substantially concentrically of the spherical space. It will be appreciated that, that pair of the magnets which is not shown, is provided on a diameter orthogonally of the plane of FIG. 1.

Similarly, equi-spaced upon the surface of the spherical shell 11 are three pairs (of which again only two pairs are shown) of tangential drive magnets 16.

Figure 2:
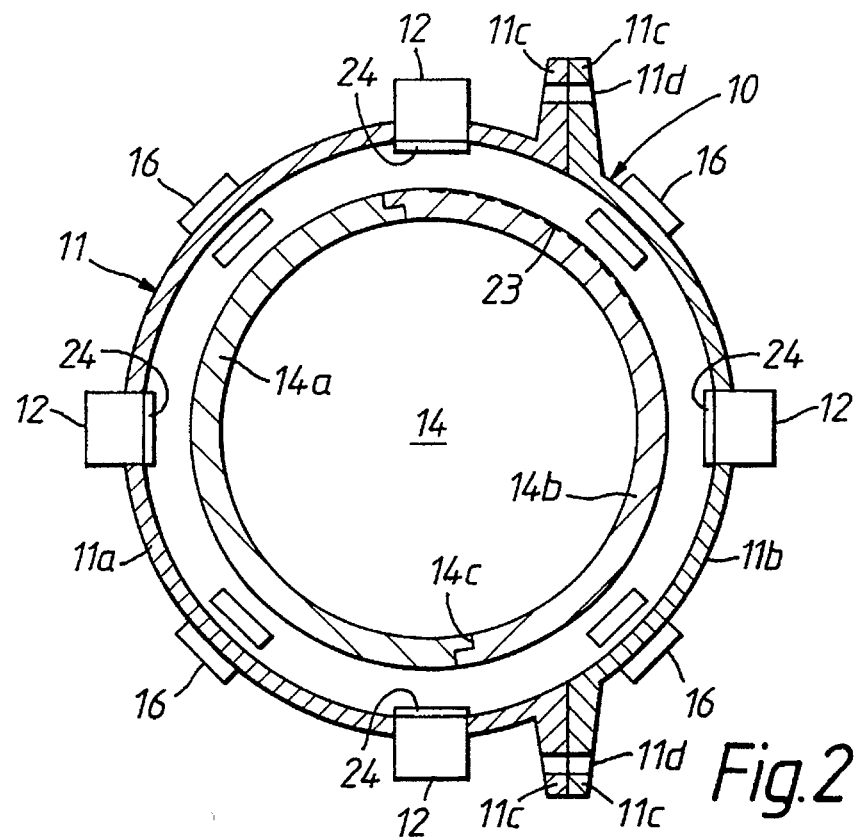
FIG. 2 is a cross-section of a vibration cancellation device according to the present invention.
Figure 3:
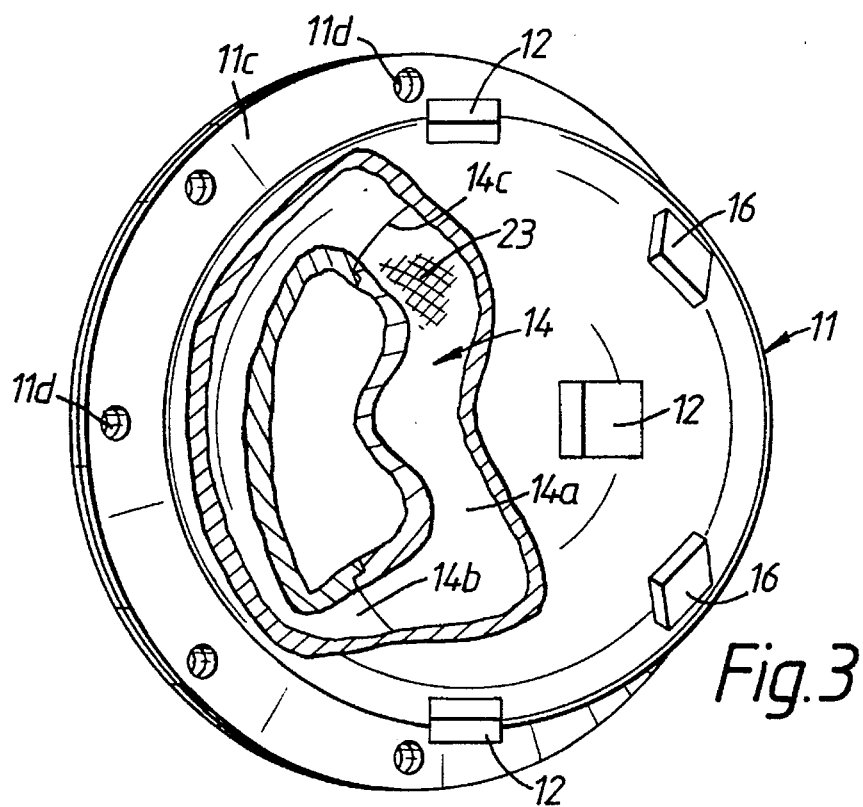
FIG. 3 is a perspective view, part broken away, of the device of FIG. 2.

At least one of each pair of radial drive magnets 12 is provided with a proximity sensor 18 (not shown in FIGS. 2 and 3) and at least one of one pair of tangential drive magnets 16 is provided with photo sensing means 20 (not shown in FIGS. 2 and 3).

The proximity sensors 18 serve to control, via control means 22 (FIG. 1 ), the magnetically levitated state of the sphere 14, by causing the radial drive magnets 12 to produce magnetic fields contactlessly supporting and holding the sphere 14 substantially concentrically of the spherical space i.e. motionless in any direction, in its rest state. Similarly, the sensing means 20, in conjunction with markings 23 on the surface of the sphere 14, provide an output to the control means 22 which then drives the tangential drive magnets 16 to ensure, in its rest state, non-rotation of the sphere 14 about any axis.

It will be appreciated that, if the apparatus of which the vibration is to be cancelled, is mounted on a moving platform, for example, is the engine in a boat, then the rest state of the sphere 14 is motionless only with respect to its shell 11. Compensative drive for such low frequency motion serves merely to maintain the relative stationary position.

Boat motions, for example, generally have frequencies less than 1 Hz. If this is taken as a maximum platform non-vibrational frequency, then discrimination can be applied in the control circuits to render the sphere 14 motionless relative to its shell 14 in response to such movement, and to cause vibration of the sphere 14 in the shell for frequencies of movement or rotation above this rate.

The proximity sensors 18 and photosensing means 20 constitute first and second sensing means. When vibration in at least one plane of the frame 10 is imparted thereto by the apparatus or structure to which it is rigidly mounted, the first sensing means, one or more of the proximity sensors 18, senses a change in the proximity of the sphere 14 thereto. Via a feedback loop, the sensed change in proximity is used to cause one or more of the radial drive magnets 12 to apply magnetic forces to the sphere 14 in a direction such as to move the sphere and cancel the change in proximity. Similarly, when vibration occurs about at least one axis of the frame 10, the second sensing means, one or more of the photosensing means 20, senses a change in the orientation of the sphere 14 relative thereto and to the shell 11. Via a feedback loop, the sensed change in orientation is used to cause one or more of the tangential drive magnets 16 to apply magnetic forces to rotate the sphere 14 in a direction such as to cancel the change in orientation, i.e. to vibrate the sphere in directions and/or orientations matching those of the sensed vibrations of the structure. The reactions to the applied magnetic forces give to the structure an anti-phase momentum in a direction cancelling vibration.

At least the radial drive magnets 12 have shock absorbent surfaces 24, e.g., of synthetic rubber (see FIGS. 1 and 2), to prevent damage should a shock, applied to the device, cause the sphere 14 to impact one or more of the magnets 12 before the proximity sensors 18 and radial drive magnets 12 could cause corrective movement of the sphere 14.

In use, the shell 11 is mounted by means of bolts through the holes 11d in the flanges 11c to the frame which, in turn, is bolted to an apparatus subject to vibration. The vibration may be in any direction and/or angular about any axis. In order to cause corrective movement of the sphere 14 in the spherical space, the proximity sensors 18 and/or the photosensors 20, through the control means 22, cause current to be fed to the radial drive magnets 12 and/or the tangential drive magnets 16, to cause the sphere to vibrate in a manner tending initially to eliminate (or minimise) relative movement between the sphere 14 and the shell 11 of the frame 10 (and the magnets). The reaction of the forces applied to the sphere 14, in this way, serve to reduce or cancel the vibration of the frame 10 (and the apparatus whereto it is mounted). Thus, in cancelling vibration, the ultimate aim is for the frame 10 (and the structure whereto it is rigidly mounted) to remain stationary and for the sphere 14 to vibrate under the action of the drive magnets 12 and 16

The first and second sensing means are sufficient to enable relatively low frequency cancellation (or minimization) of vibration. At higher frequencies of vibration, it is preferable to use additional or alternative sensing means. These additional or alternative sensing means may be mounted on the frame 10, to sense the vibration thereof directly, and/or on the sphere 14, to measure the vibration imparted thereto by the magnets 12 and 16. Accelerometers, for example, piezoelectric devices may provide the alternative or additional sensing means.

If the additional or alternative sensing means are mounted on the shell 11 or the vibrating apparatus, and measure directly vibration of the apparatus to which the frame is secured, real time, as opposed to response time, drive may be applied to the magnets 12 and/or 16 to cause the sphere 14 to vibrate and thus minimize or prevent movement of the frame 10. Further, predictive drive is feasible because most vibrations are of a cyclical nature and repeat at discernible frequencies.

As shown in FIG. 1, accelerometers 26 are provided, internally of the sphere 14, to measure the vibration imparted to the sphere 14. The accelerometers feed an output box 28 located in the sphere 14. The box 28 contains electronic circuitry for example, A/D convertors, multiplexors and electro-optic transducers whereby the signals from the accelerometers 26 may be fed, from the sphere 14, for example, via a single optical fibre 30 (not shown in FIGS. 2 and 3). The fibre 30 provides no support for the sphere 14 and is sufficiently flexible to minimize or eliminate any damping effect on the movement of the sphere. Instead of a fibre optic cable 30, thin electrical conductors may be used. However, any damping effect must be minimized and support for the sphere 14, must not be provided.

The output of the accelerometers 26, via the cable 30, may be analyzed to indicate the vibration of the sphere 14. In theory, the vibration of the sphere 14 is directly indicative of the vibration of the device and of the apparatus to which the device is rigidly mounted. Thus, if additional or alternative sensing means are mounted on the frame 10 as suggested above, the accelerometers 26 provide a comparative means for applying corrective drive to the magnets 12, 16. If the output of the proximity sensors 18 and of the photosensors 20 is also monitored, for example in the control means 22, the outputs could also be compared with that of the accelerometers 26 and a feedback loop established in the control of the magnets 12 and 16 to tune the device and to minimize hysteresis in the cancellation of vibration.

Alternatively, the device could be tuned to provide fixed frequency or broad band vibration cancellation or minimization.

The two important features of the device of the present invention are (i) that there are no moving parts that can wear out so the system should be very reliable indeed and (ii) that the system can survive very considerable linear shocks-these, at worst, cause the sphere to impact the electromagnets—and the impact can be softened by the use of the thin synthetic rubber covering 24.

In order to sense the motion of the steel sphere accurately over the full frequency band, for example 0 to 500 Hz or greater, the accelerometers 26 are mounted, as shown in FIG. 1, near the surface of the sphere 14 and are placed at opposite ends of three mutually orthogonal axes. If these axes are numbered 1,2 and 3 then the accelerometers at the ends of axis 1, 2 and 3 respectively, are orientated parallel to axes 2, 3 and 1 respectively. By integrating the outputs of these accelerometers, all the components of the instantaneous linear and angular velocities of the sphere 14 can be determined. This arrangement would give accurate measurements at higher frequencies. To avoid error build up at the lower frequencies, the external position and orientation sensors 18 and 20 are necessary. This would ensure that the control could accurately keep the mean position of the center of and the mean orientation of the sphere 14 correctly positioned. Further, by suitable digital signal processing, one could use the proximity sensors 18, the orientation sensors 20 and the accelerometers 26, along with suitable complementary cross-over filters, to give the most precise measurement of linear and angular acceleration over the full frequency band. Frequencies below a certain lower limit, e.g., 1 Hz would be analyzed as platform motion and drive would be applied via the electromagnets to maintain the sphere 14 motionless relative to its shell, while frequencies greater than this lower limit would be analyzed as vibration to be cancelled.

The external position sensors 18 can take any of a number of forms all of which are known in the prior art. Orientation sensing by the sensors 20 is more difficult but could be achieved by an optical coding technique whereby the movement of a pattern 23 on the sphere 14 is observed passing fixed locations whereby the direction and total angular movement can be tracked. Alternatively, if the surface of the sphere 14 were ferro-magnetically non-uniform, Hall effect devices or linear differential transformers could be used to sense rotation of the sphere. For low frequency control, these sensors 18 and 20 could provide all the information necessary but, for higher frequency control, the accelerometers, mounted in the sphere 14 and/or on the frame 10, are far more accurate.

Extraction of the accelerometer outputs from the moving sphere need not be effected by the cable 30. There are several non-contacting techniques for transmitting such accelerometer information to the external control means 22. These techniques all require some power to be available within the sphere 14. This power may be made available by non-contacting transfer provided by a suitable electromagnetic coupling technique.

A simpler, but more restrictive, alternative to the above described device, is to limit the maximum angular excursions of the sphere 14 by including several lugs (not shown) on the sphere 14 to impact stops (also not shown) for example, the sides of the electromagnets 12, 16. In this arrangement, the outputs from the accelerometers could again be multiplexed onto a single optical fibre which very loosely couples the sphere 14 to the external control means 22. Electric power to the sphere 14 if necessary, may be provided via two thin and flexible wires coupling the sphere to a power source on the device. Considerable care would be needed to minimize the possibility that these couplings to the sphere could become the least reliable part of the complete vibration cancelling device.

In theory, only three radial drive magnets 12 and only three tangential drive magnets 16 are necessary. Three magnets (12 or 16) on the surface of the spherical space, with appropriate sensors can detect movement and apply corrective drive to the sphere 14. However, electromagnetic drives are non-linear drives and difficulties arise in the control exercised by the control means 22 in calculating the drive to be applied by the magnets.

Further, it is possible that combined radial and tangential drive magnets may be used so that each magnet may be energized in either or both of two ways to impart linear or rotational or linear and rotational drive to the sphere.

In a simpler, more compact device, the sphere 14 is a solid ferro-magnetic body. Its size can then be much smaller for the same weight. External sensors 18, 20 and 26 are then used to determine vibration of the structure and/or frame 10 and the drive applied to the magnets 12, 16. If vibration is overcancelled in this way, the external sensors provide self correction by sensing vibration resulting therefrom.

In another embodiment, the sphere 14, although symmetrical, has non-uniform ferro-magnetic surface properties caused by inserts or by internal ribs to a hollow sphere.

I claim:

1. A vibration cancellation device comprising:

a substantially spherical housing having mounting means for mounting the substantially spherical housing to a structure which may have vibrations which are to be cancelled by the device;

a substantially spherical auxiliary mass freely positioned within the substantially spherical housing;

magnetic radial drive levitation means for producing at least one first magnetic force which acts on the substantially spherical auxiliary mass;

proximity sensor means, associated with the magnetic radial drive levitation means, for sensing the proximity of the substantially spherical auxiliary mass;

magnetic tangential drive levitation means for producing at least one second magnetic force which acts on the substantially spherical auxiliary mass;

photosensor means, associated with the magnetic radial drive levitation means, for sensing the relative angular position of the substantially spherical auxiliary mass with respect to the substantially spherical housing; and control means, operatively connected to the magnetic radial drive levitation means and the magnetic tangential drive levitation means for selectively energizing the magnetic radial drive levitation means and the magnetic tangential drive levitation means, and to the proximity sensor means and the photosensor means for receiving at least one signal therefrom indicative of position and relative movement of the substantially spherical auxiliary mass with respect to the substantially spherical housing;

wherein the magnetic radial drive levitation means and the magnetic tangential drive levitation means, when selectively energized under control of the control means, can move the spherical auxiliary mass in six degrees of freedom relative to the substantially spherical housing;

wherein the control means selectively energizes the magnetic radial drive levitation means and the magnetic tangential drive levitation means to either maintain the substantially spherical auxiliary mass in a predetermined position in relation to the substantially spherical housing, or to move the substantially spherical auxiliary mass in relation to the substantially spherical housing, thereby producing a reaction force to cancel vibrations of the structure.

2. A device as claimed in claim 1, wherein the radial drive levitation means comprises three pairs of radial drive levitators, each pair of radial drive levitators being located orthogonally with respect to the other pairs; and wherein the tangential drive levitation means comprises three pairs of tangential drive levitators, each pair of tangential drive levitators being located orthogonally with respect to the other pairs.

3. The device as claimed in claim 1 wherein the radial drive levitation means comprises three radial drive levitators; and wherein the tangential drive levitation means comprises three tangential drive levitators.

4. A device as claimed in claim 1 wherein the substantially spherical housing comprises two parts, each part being a partial sphere, and wherein the two parts are of unequal size.

5. A device as claimed in claim 1 wherein the substantially spherical auxiliary mass is hollow and comprises two hemispheres.

6. A device as claimed in claim 1 wherein the substantially spherical auxiliary mass comprises a solid sphere.

7. A device as claimed in claim 1 wherein the substantially spherical auxiliary mass comprises a ferromagnetic material.

8. A device as claimed in claim 1, further comprising shock absorbing means for absorbing shocks and securing means for securing the shock absorbing means to the radial drive levitation means.

9. A device as claimed in claim 1, further comprising:
first stop means;
first mounting means for mounting the first stop means on the substantially spherical auxiliary mass;
second stop means; and
second mounting means for mounting the second stop means on the substantially spherical housing;
wherein the first and second stop means are disposed for limiting the relative angular movement between the substantially spherical auxiliary mass and the substantially spherical housing.

10. A device as claimed in claim 1, further comprising optical coding means disposed on the substantially spherical auxiliary mass, wherein the photosensor means is adapted to read the optical coding means to produce a signal indicative of the angular position of the substantially spherical auxiliary mass relative to the substantially spherical housing.

11. A device as claimed in claim 1, wherein the substantially spherical auxiliary mass comprises non-uniform surface means; and
wherein the photosensor means generates a signal responsive to the non-uniform surface means to indicate an angular position of the substantially spherical auxiliary mass relative to the substantially spherical housing.

12. A device as claimed in claim 1, wherein the mounting means for mounting the substantially spherical housing to a structure comprises at least one flange for securing the substantially spherical housing to the structure.

13. A device as claimed in claim 1 wherein the substantially spherical housing comprises non-ferromagnetic material.

14. A vibration cancellation device comprising:
a substantially spherical housing having mounting means for mounting the substantially spherical housing to a structure which may vibrate;
a substantially spherical auxiliary mass freely positioned within the substantially spherical housing;
magnetic radial drive levitation means for applying at least one first magnetic force to the substantially spherical auxiliary mass;
magnetic tangential drive levitation means for applying at least one second magnetic force to the substantially spherical auxiliary mass;
sensor means for sensing movement of the spherical auxiliary mass and producing at least one signal indicative thereof;
control means, operatively connected to the magnetic radial drive levitation means, the magnetic tangential drive levitation means, and the sensor means, for selectively energizing the magnetic radial drive levitation means and the magnetic tangential drive levitation means to move the substantially spherical auxiliary mass in six degrees of freedom relative to the substantially spherical housing in response to the at least one signal from the sensor means.

15. A vibration cancellation device comprising:
a substantially spherical housing and mounting means for mounting the substantially spherical housing on a structure which may vibrate;
a substantially spherical auxiliary mass freely positioned within the substantially spherical housing;
magnetic radial drive levitation means for applying at least one first magnetic force on the substantially spherical auxiliary mass;
magnetic tangential drive levitation means for applying at least one second magnetic force on the substantially spherical auxiliary mass;
first sensor means, associated with the magnetic radial drive levitation means, for sensing a change in proximity of the substantially spherical auxiliary mass and producing at least one signal indicative thereof;
second sensor means, associated with the magnetic tangential drive levitation means, for sensing a change in orientation of the substantially spherical auxiliary mass and producing at least one signal indicative thereof;
control means, operatively coupled to the magnetic radial drive levitation means, the magnetic tangential drive levitation means, and the first and second sensor means, for selectively energizing the magnetic radial drive levitation means and the magnetic tangential drive levitation means to move the substantially spherical auxiliary mass in six degrees of freedom relative to the substantially spherical housing in response to the at least one signal from the first and second sensor means.

16. A vibration cancellation device comprising:
a substantially spherical housing having mounting means for mounting the substantially spherical housing on a structure which may vibrate;
a substantially spherical auxiliary mass freely positioned within the substantially spherical housing;
magnetic drive levitation means for selectively applying at least one driving force to the substantially spherical auxiliary mass, the at least one driving force being at least one of a radial and a tangential force;
sensor means for sensing at least one of a change in proximity of the substantially spherical auxiliary mass and a change in orientation of the substantially spherical auxiliary mass, and generating at least one signal indicative thereof;
control means, operatively connected to the magnetic drive levitation means and to the sensor means, for selectively energizing the magnetic drive levitation means to move the substantially spherical auxiliary mass in six degrees of freedom relative to the substantially spherical housing in response to the at least one signal generated by the sensor means.

17. A vibration cancellation device comprising:
a substantially spherical housing having mounting means for mounting the substantially spherical housing to a structure which may have vibrations which are to be cancelled by the device;
a substantially spherical auxiliary mass located within the substantially spherical housing;
magnetic radial drive levitation means for producing at least one first magnetic force which acts on the substantially spherical auxiliary mass;

proximity sensor means, associated with the magnetic radial drive levitation means, for sensing the proximity of the substantially spherical auxiliary mass;

magnetic tangential drive levitation means for producing at least one second magnetic force which acts on the substantially spherical auxiliary mass;

photosensor means, associated with the magnetic radial drive levitation means, for sensing the relative angular position of the substantially spherical auxiliary mass with respect to the substantially spherical housing;

control means, operatively connected to the magnetic radial drive levitation means and the magnetic tangential drive levitation means for selectively energizing the magnetic radial drive levitation means and the magnetic tangential drive levitation means, and to the proximity sensor means and the photosensor means for receiving at least one signal therefrom indicative of position and relative movement of the substantially spherical auxiliary mass with respect to the substantially spherical housing;

wherein the magnetic radial drive levitation means and the magnetic tangential drive levitation means, when selectively energized under control of the control means, can move the spherical auxiliary mass in six degrees of freedom relative to the substantially spherical housing;

wherein the control means selectively energizes the magnetic radial drive levitation means and the magnetic tangential drive levitation means to either maintain the substantially spherical auxiliary mass in a predetermined position in relation to the substantially spherical housing, or to move the substantially spherical auxiliary mass in relation to the substantially spherical housing, thereby producing a reaction force to cancel vibrations of the structure; and accelerometer means, mounted to at least one of the substantially spherical auxiliary mass and the substantially spherical housing, and operatively coupled to the control means, for providing at least one signal to the control means as a measure of vibration of the substantially spherical auxiliary mass.

18. A device as claimed in claim 17 wherein the accelerometer means comprises at least one piezo-electric accelerometer.

19. A device as claimed in claim 18 wherein at least one piezo-electric accelerometer is mounted inside the substantially spherical auxiliary mass.

20. A device as claimed in claim 17 wherein the accelerometer means is mounted inside the substantially spherical auxiliary mass.

21. A device as claimed in claim 17, wherein the accelerometer means comprises:

at least one piezo-electric accelerometer; and an output box operatively coupling the at least one piezo-electric accelerometer with the control means.

22. A device as claimed in claim 17, wherein the accelerometer means comprises:

at least one piezo-electric accelerometer;

an output box operatively coupled to the at least one piezo-electric accelerometer; and optical fibre connection means for operatively coupling the output box with the control means.

* * * * *